(12) United States Patent
Potharaju et al.

(10) Patent No.: US 11,272,407 B2
(45) Date of Patent: Mar. 8, 2022

(54) USER EQUIPMENT FINGERPRINTING BASED ON REFERENCE SIGNAL

(71) Applicant: Cisco Technology, Inc., San Jose, CA (US)

(72) Inventors: Shailender Potharaju, Fremont, CA (US); Rajesh S. Pazhyannur, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1 day.

(21) Appl. No.: 16/681,248

(22) Filed: Nov. 12, 2019

(65) Prior Publication Data

US 2021/0144602 A1 May 13, 2021

(51) Int. Cl.
*H04W 36/00* (2009.01)
*H04L 5/00* (2006.01)

(52) U.S. Cl.
CPC ..... *H04W 36/00835* (2018.08); *H04L 5/0048* (2013.01)

(58) Field of Classification Search
CPC ............. H04W 36/00835; H04L 5/0048
See application file for complete search history.

(56) References Cited

U.S. PATENT DOCUMENTS

| | | |
|---|---|---|
| 8,811,144 B2 | 8/2014 | Chatterjee et al. |
| 9,084,238 B2 | 7/2015 | Gao et al. |
| 9,549,351 B2 * | 1/2017 | Wanstedt .......... H04W 36/0077 |
| 9,635,577 B2 | 4/2017 | Seo et al. |
| 2011/0263262 A1 * | 10/2011 | Min ...................... H04W 36/32 455/438 |
| 2012/0028664 A1 * | 2/2012 | Zhang .................. H04W 16/14 455/501 |
| 2012/0099503 A1 * | 4/2012 | Guo ..................... H04W 24/10 370/312 |
| 2013/0203447 A1 * | 8/2013 | Hannan ................ H04W 64/00 455/456.5 |
| 2013/0229971 A1 * | 9/2013 | Siomina ............... H04W 24/10 370/312 |

(Continued)

FOREIGN PATENT DOCUMENTS

| | | | | |
|---|---|---|---|---|
| EP | 2947944 B1 * | 7/2019 | ........ | H04W 72/1226 |
| WO | WO-2018029364 A1 * | 2/2018 | ........... | H04B 7/0695 |

OTHER PUBLICATIONS

Xiaolin Hou et al., "Demodulation Reference Signal Design and Channel Estimation for LTE-Advanced Uplink", Advances in Vehicular Networking Technologies, ISBN: 978-953-307-241-8, InTech, 2011, 18 pages.

(Continued)

*Primary Examiner* — Jay P Patel
(74) *Attorney, Agent, or Firm* — Edell, Shapiro & Finnan, LLC (57) ABSTRACT

In one example, a first base station entity provides, to a second base station entity, a first indication of a reference signal that is transmitted by a first user equipment that the first base station entity is serving. The first base station entity obtains, from the second base station entity, a second indication of whether the second base station entity has detected the reference signal. Based on the second indication, the first base station entity determines whether the second base station entity is within a range of the first user equipment.

20 Claims, 7 Drawing Sheets

(56) References Cited

U.S. PATENT DOCUMENTS

| | | | | |
|---|---|---|---|---|
| 2013/0244664 A1* | 9/2013 | Song | H04W 36/0085 | 455/437 |
| 2014/0286326 A1* | 9/2014 | Jang | H04W 64/003 | 370/338 |
| 2015/0072686 A1* | 3/2015 | Xu | H04W 36/0061 | 455/436 |
| 2015/0215103 A1* | 7/2015 | Tsai | H04L 1/00 | 370/329 |
| 2015/0271713 A1* | 9/2015 | Kim | H04W 76/15 | 455/437 |
| 2015/0271714 A1* | 9/2015 | Shetigar | H04W 36/0061 | 370/255 |
| 2015/0271864 A1* | 9/2015 | Nigam | H04W 48/16 | 370/252 |
| 2015/0312815 A1* | 10/2015 | Wanstedt | H04W 72/044 | 455/436 |
| 2015/0349908 A1* | 12/2015 | Centonza | H04W 52/36 | 370/329 |
| 2017/0034751 A1* | 2/2017 | Fujishiro | H04W 36/00837 | |
| 2017/0078895 A1* | 3/2017 | Sriram | H04W 24/10 | |
| 2017/0347270 A1* | 11/2017 | Iouchi | H04W 72/0406 | |
| 2018/0063757 A1* | 3/2018 | Gormley | H04W 8/26 | |
| 2018/0270787 A1* | 9/2018 | Drevon | H04W 36/385 | |
| 2018/0359790 A1* | 12/2018 | Ingale | H04W 28/16 | |
| 2018/0376484 A1* | 12/2018 | Beale | H04W 72/0473 | |
| 2019/0149365 A1* | 5/2019 | Chatterjee | H04L 5/0094 | 370/329 |
| 2019/0174436 A1* | 6/2019 | da Silva | H04W 16/12 | |
| 2019/0174449 A1* | 6/2019 | Shan | H04W 60/04 | |
| 2020/0351694 A1* | 11/2020 | Chen | H04W 36/0083 | |

OTHER PUBLICATIONS

Frank Rayal, "An overview of the LTE physical layer—Part II", EE Times, https://www.eetimes.com/document.asp?doc_id=1278137#, Jun. 20, 2010, 3 pages.

\* cited by examiner

```
┌─────────────────────────────────────────────────────────────┐  610
│  PROVIDE, TO A SECOND BASE STATION ENTITY, A FIRST INDICATION OF A  │
│  REFERENCE SIGNAL THAT IS TRANSMITTED BY A FIRST USER EQUIPMENT     │
│         THAT THE FIRST BASE STATION ENTITY IS SERVING               │
└─────────────────────────────────────────────────────────────┘
                              │
                              ▼
┌─────────────────────────────────────────────────────────────┐  620
│       OBTAIN, FROM THE SECOND BASE STATION ENTITY, A SECOND         │
│     INDICATION OF WHETHER THE SECOND BASE STATION ENTITY HAS        │
│                    DETECTED THE REFERENCE SIGNAL                    │
└─────────────────────────────────────────────────────────────┘
                              │
                              ▼
┌─────────────────────────────────────────────────────────────┐  630
│     BASED ON THE SECOND INDICATION, DETERMINE WHETHER THE SECOND    │
│      BASE STATION ENTITY IS WITHIN A RANGE OF THE FIRST USER        │
│                              EQUIPMENT                              │
└─────────────────────────────────────────────────────────────┘
```

FIG.6

USER EQUIPMENT FINGERPRINTING BASED ON REFERENCE SIGNAL

TECHNICAL FIELD

The present disclosure relates to computer networks.

BACKGROUND

User Equipments (UEs) in fourth generation (4G) and fifth generation (5G) wireless networks send Demodulation Reference Signals (DMRSs) in uplink transmissions for channel estimation. A DMRS is a sequence that is sent with data on the Physical Uplink Shared Channel (PUSCH) and Physical Uplink Control Channel (PUCCH). Each DMRS has an embedded sequence that is unique to a given UE and Physical Cell Identifier (PCI).

DESCRIPTION OF EXAMPLE EMBODIMENTS

Overview

In one example embodiment, a first base station entity provides, to a second base station entity, a first indication of a reference signal that is transmitted by a first user equipment that the first base station entity is serving. The first base station entity obtains, from the second base station entity, a second indication of whether the second base station entity has detected the reference signal. Based on the second indication, the first base station entity determines whether the second base station entity is within a range of the first user equipment.

EXAMPLE EMBODIMENTS

Figure 1:
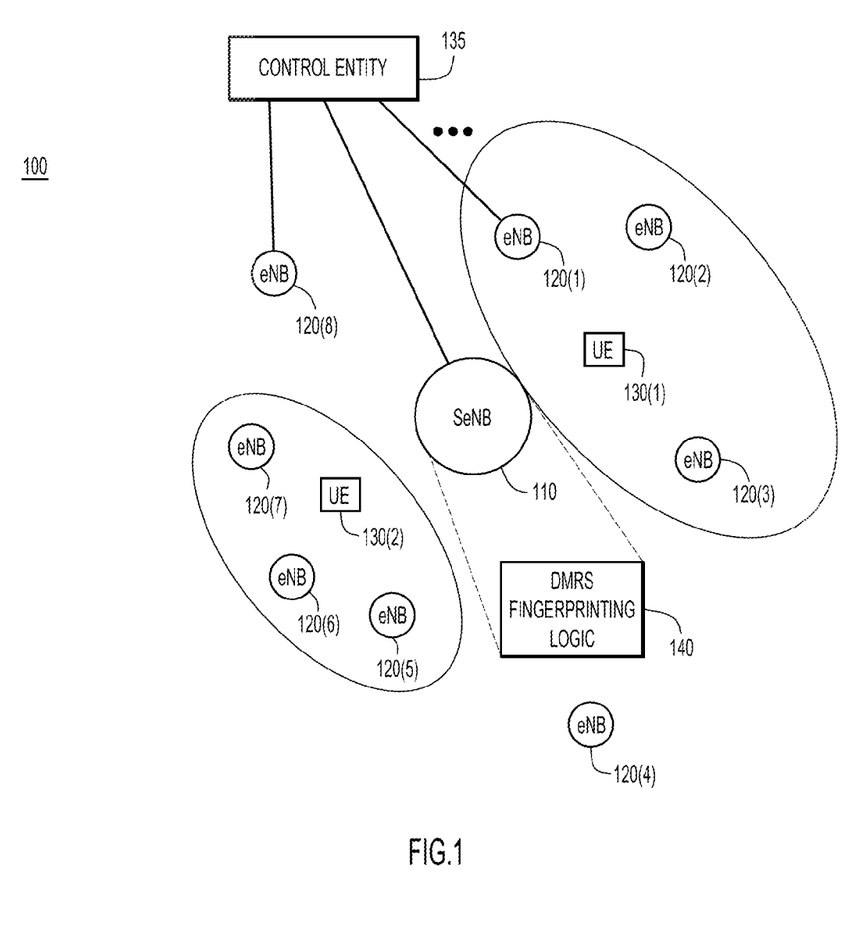
FIG. 1 illustrates a system for fingerprinting a User Equipment (UE) based on a Demodulation Reference Signal (DMRS), according to an example embodiment.

FIG. 1 illustrates a system 100 for fingerprinting a User Equipment (UE) based on a Demodulation Reference Signal (DMRS). System 100 includes a Serving eNodeB (SeNB) 110, eNBs 120(1)-120(8), and UEs 130(1) and 130(2). In some examples, system 100 may also include control entity 135 which is in communication with SeNB 110 and eNBs 120(1)-120(8). UEs 130(1) and 130(2) may be mobile phones, laptops, etc. UEs 130(1) and 130(2) are attached to SeNB 110 and are therefore achieving wireless connectivity (e.g., to the Internet) through SeNB 110. Control entity 135 may be a Mobility Management Entity (MME), a server, or any other suitable entity.

SeNB 110 and eNBs 120(1)-120(8) comprise a private fourth generation (4G) wireless network, although it will be appreciated that the techniques described herein may be implemented in any suitable wireless network technology now known or hereinafter developed (e.g., public wireless networks, fifth generation (5G) wireless networks, etc.). Furthermore, any suitable base station entities may be utilized depending on the particular wireless network technology (e.g., gNBs). In one example, SeNB 110 and eNBs 120(1)-120(8) may be Citizens Broadband Radio Service (CBRS) Devices (CBSDs) configured to operate in a CBRS environment.

UEs 130(1) and 130(2) may repeatedly scan for neighboring eNBs in order to, for example, determine whether any of the neighboring eNBs would provide a better signal strength than SeNB 110. Conventionally, SeNB 110 would discover all of its neighbors (here, eNBs 120(1)-120(8)) and provide to UEs 130(1) and 130(2) a neighbor list including every eNB 120(1)-120(8). UEs 130(1) and 130(2) would then scan the entire span of frequencies/channels corresponding to eNBs 120(1)-120(8) in the neighbor list. This is an inefficient process that consumes unnecessary time and battery power, especially if UEs 130(1) and 130(2) need to decode System Information Blocks (SIBs) in received transmissions from eNBs 120(1)-120(8).

The CBRS band is 150 MHz of the unpaired spectrum. In principle, depending on channel allocation, a CBRS eNB can have neighbors throughout the entire spectrum. In the worst case, the CBRS eNB could have neighbors in 31 different frequency channels. Because channels are likely to be 20 MHz, in a typical case of dense enterprise deployment there may be six or seven neighboring channels. As such, scanning for every neighbor CBRS eNB can be burdensome on UE resources.

Current neighbor scanning approaches cannot adequately address these issues. For example, multi-channel deployments face challenges in lowering the amount of interference within a network because a UE should be provisioned with the correct set of neighbors. Furthermore, the serving CBRS eNB typically does not a priori know the location of a UE vis-a-vis neighboring CBRS eNBs.

Accordingly, DMRS fingerprinting logic 140 is provided to cause SeNB 110 to provide pruned neighbor lists to UEs 130(1) and 130(2). Because each DMRS is unique to a given UE and Physical Cell Identifier (PCI), SeNB 110 may correlate uplink transmissions that include the DMRS to a given UE within a given cell. In particular, SeNB 110 may generate one fingerprint (e.g., DMRS-to-UE mapping) for UE 130(1) based on the DMRS sent by UE 130(1), and another fingerprint for UE 130(2) based on the DMRS sent by UE 130(2). Thus, SeNB 110 may uniquely identify UEs 130(1) and 130(2) based on their respective DMRSs.

Taking eNB 120(1) and UE 130(1) as an example, SeNB 110 may provide, to eNB 120(1), an indication of the DMRS that is transmitted by UE 130(1). This may enable eNB 120(1) to listen for that DMRS. SeNB 110 may obtain, from eNB 120(1), an indication of whether eNB 120(1) has detected the DMRS. For instance, if eNB 120(1) has detected the DMRS, eNB 120(1) may indicate that eNB 120(1) has detected the DMRS. Similarly, if eNB 120(1) has not detected the DMRS, eNB 120(1) may indicate that eNB 120(1) has not detected the DMRS.

Based on the indication of whether eNB 120(1) has detected the DMRS, SeNB 110 may determine whether eNB 120(1) is within a range of UE 130(1). The range may be a Radio Frequency (RF) range from eNB 120(1) at which eNB 120(1) can serve UE 130(1). If SeNB 110 obtains an indication that eNB 120(1) has detected the DMRS, SeNB 110 determines that eNB 120(1) is within a range of UE 130(1). Similarly, if SeNB 110 obtains an indication that eNB 120(1) has not detected the DMRS, SeNB 110 determines that eNB 120(1) is not within a range of UE 130(1).

SeNB 110 may also perform this process for eNBs 120(2)-120(8) and UE 130(2). In this example, SeNB 110 determines that eNBs 120(1)-120(3) are within a range of UE 130(1), and eNBs 120(5)-120(7) are within a range of UE 130(2). SeNB 110 may generate a first pruned neighbor list including an identification of eNBs 120(1)-120(3) and excluding an identification of eNBs 120(4)-120(8), and provide the first pruned neighbor list to UE 130(1). Similarly, SeNB 110 may generate a second pruned neighbor list including an identification of eNBs 120(5)-120(7) and excluding an identification of eNBs 120(1)-120(4) and 120(8), and provide the second pruned neighbor list to UE 130(2).

The first and second pruned neighbor lists may enable UEs 130(1) and 130(2) to scan for only eNBs 120(1)-120(3) and eNBs 120(5)-120(7), respectively, instead of every eNB 120(1)-120(8). This reduces the time, battery power consumption, and computational resources required by UEs 130(1) and 130(2) to scan for neighbor eNBs. Thus, SeNB 110 uses DMRSs as distinct fingerprints (given the PCI and resource block at which the DMRS is received) to determine a pruned neighbor list for each UE.

It will be appreciated that while DMRS is used in the example of FIG. 1, any suitable reference signal may be utilized to implement the techniques described herein. Furthermore, DMRS fingerprinting logic 140 may be included in any suitable entity, such as control entity 135. Thus, in certain examples, control entity 135 may perform one or more of the operations described herein with respect to UE fingerprinting.

Figure 2A:
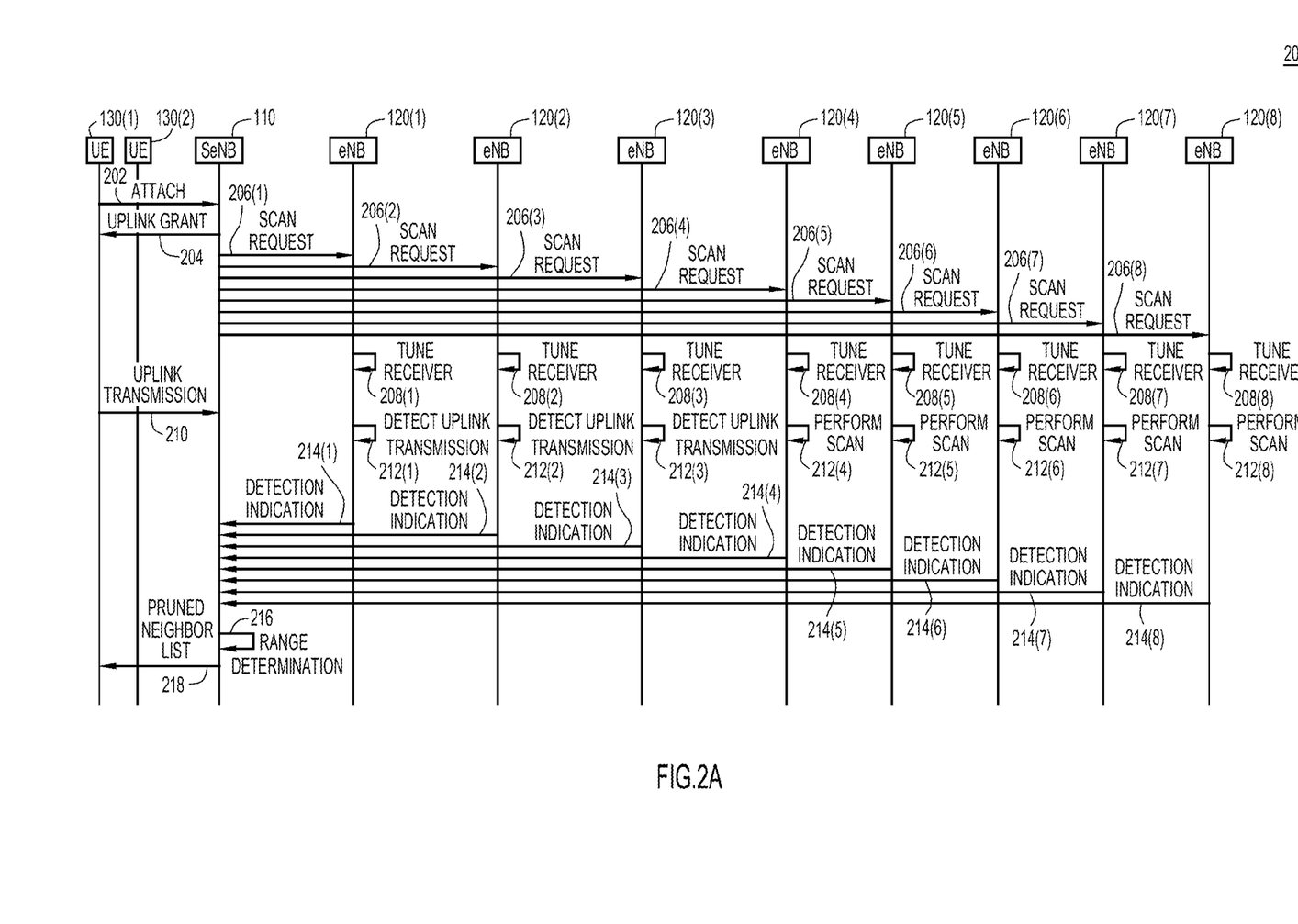
FIGS. 2A and 2B collectively illustrate a sequence diagram of a method for pruning a neighbor list based on a DMRS, according to an example embodiment.
Figure 2B:
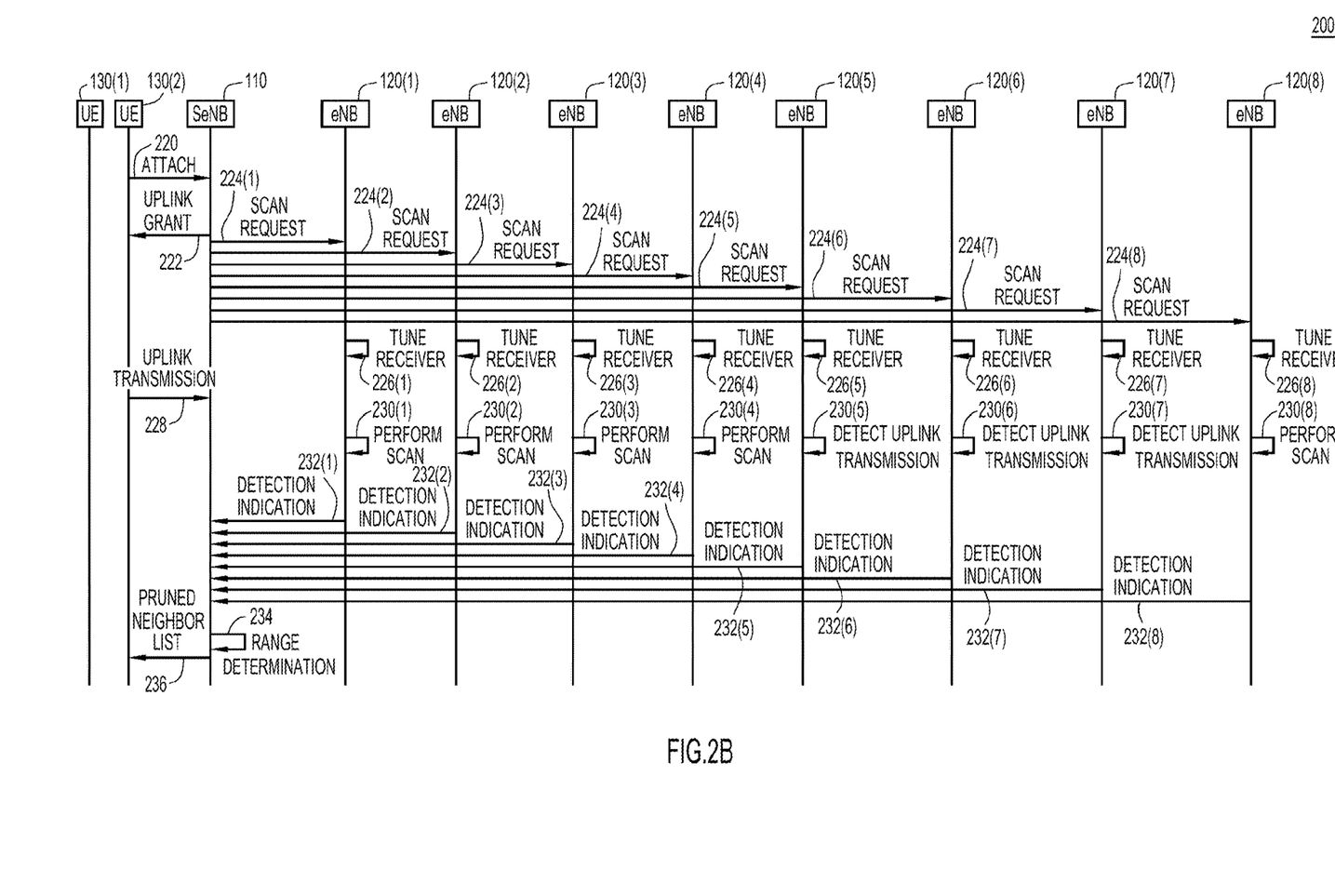

Turning now to FIGS. 2A and 2B, and with continued reference to FIG. 1, shown is a sequence diagram of a method 200 for pruning a neighbor list based on a DMRS. FIG. 2A relates to pruning a neighbor list for UE 130(1), and FIG. 2B relates to pruning a neighbor list for UE 130(2). Referring first to FIG. 2, At 202, UE 130(1) attaches to SeNB 110. At 204, SeNB 110 allocates an uplink grant to UE 130(1) to enable uplink transmission. At 206(1)-206(8), SeNB 110 provides, to eNBs 120(1)-120(8), an indication of the DMRS that is transmitted by UE 130(1). SeNB 110 may also provide, to eNBs 120(1)-120(8), an identification of UE 130(1) (e.g., a Cell Radio Network Temporary Identifier (C-RNTI)), a time slot of the DMRS, an identification of a cell that includes SeNB 110 (e.g., a PCI), and/or a frequency used by SeNB 110. In one example, SeNB 110 provides this information in respective scan requests to eNBs 120(1)-120(8).

eNBs 120(1)-120(8) may create respective schedules to periodically scan neighboring frequencies. At 208(1)-208(8), eNBs 120(1)-120(8) tune one or more respective receivers to the frequency used by SeNB 110. In one example, eNBs 120(1)-120(8) may utilize one or more scanning radios to minimize cell outage to UEs served by eNBs 120(1)-120(8). At 210, UE 130(1) sends an uplink transmission to SeNB 110, although the uplink transmission may also be detectable by other eNBs. The uplink transmission may include the DMRS. At 212(1)-212(3), eNBs 120(1)-120(3) detect the uplink transmission because eNBs 120(1)-120(3) are within a range of UE 130(1) and decodes the DMRS signal. Based on the DMRS signal and the information in the scan request, eNBs 120(1)-120(3) may determine the identification of the cell that includes SeNB 110 as well as the identification of UE 130(1). At 212(4)-212(8), eNBs 120(4)-120(8) perform a scan at the frequency used by SeNB 110 but do not detect the uplink transmission because eNBs 120(4)-120(8) are not within a range of UE 130(1).

At 214(1)-214(3), SeNB 110 obtains, from eNBs 120(1)-120(3), respective indications that eNBs 120(1)-120(3) have detected the DMRS. SeNB 110 may further obtain, from eNBs 120(1)-120(3), the identification of UE 130(1) and respective measured signal strengths corresponding to the DMRS. The measured signal strengths may be the strength of the uplink transmission as received by eNBs 120(1)-120(3) (e.g., Received Signal Strength Indicator (RSSI) reported by eNBs 120(1)-120(3)). At 214(4)-214(8), SeNB 110 obtains, from eNBs 120(4)-120(8), respective indications that eNBs 120(4)-120(8) have not detected the DMRS. SeNB 110 may obtain these indications periodically from eNBs 120(1)-120(8) over extensions to the X2 interface.

At 216, SeNB 110 determines that UE 130(1) is within the range(s) of eNBs 120(1)-120(3), and that UE 130(1) is not within the range of eNBs 120(4)-120(8). SeNB 110 may prepare an RF map indicating as much and compute a position of UE 130(1). Based on the RF map, SeNB 110 may further generate a pruned neighbor list including an identification of eNBs 120(1)-120(3), and excluding an identification of eNBs 120(4)-120(8). At 218, SeNB 110 provides the pruned neighbor list to UE 130(1). If UE 130(1) does not hand over to eNBs 120(1)-120(3), SeNB 110 may provide a non-pruned neighbor list (including eNBs 120(4)-120(8)) to UE 130(1) in order to address the possibility that eNBs 120(4)-120(8) detected the DMRS but did not report this detection to SeNB 110.

Turning now to FIG. 2B, at 220, UE 130(2) attaches to SeNB 110. At 222, SeNB 110 allocates an uplink grant to UE 130(2) to enable uplink transmission. At 224(1)-224(8), SeNB 110 provides, to eNBs 120(1)-120(8), an indication of the DMRS that is transmitted by UE 130(2). SeNB 110 may also provide, to eNBs 120(1)-120(8), an identification of UE 130(2) (e.g., a C-RNTI), a time slot of the DMRS, an identification of a cell that includes SeNB 110 (e.g., a PCI), and/or a frequency used by SeNB 110. In one example, SeNB 110 provides this information in respective scan requests to eNBs 120(1)-120(8).

eNBs 120(1)-120(8) may create respective schedules to periodically scan neighboring frequencies. At 226(1)-226(8), eNBs 120(1)-120(8) tune one or more respective receivers to the frequency used by SeNB 110. In one example, eNBs 120(1)-120(8) may utilize one or more scanning radios to minimize cell outage to UEs served by eNBs 120(1)-120(8). At 228, UE 130(2) sends an uplink transmission to SeNB 110, although the uplink transmission may also be detectable by other eNBs. The uplink transmission may include the DMRS. At 230(5)-230(7), eNBs 120(5)-120(7) detect the uplink transmission because eNBs 120(5)-120(7) are within a range of UE 130(2) and decode the DMRS signal. Based on the DMRS signal and the information in the scan request, eNBs 120(5)-120(7) may determine the identification of the cell that includes SeNB 110 as well as the identification of UE 130(2). At 230(1)-230(4) and 230(8), eNBs 120(1)-120(4) and 120(8) perform a scan at the frequency used by SeNB 110 but do not detect the uplink transmission because eNBs 120(1)-120(4) and 120(8) are not within a range of UE 130(2).

At 232(5)-232(7), SeNB 110 obtains, from eNBs 120(5)-120(7), respective indications that eNBs 120(5)-120(7) have detected the DMRS. SeNB 110 may further obtain, from eNBs 120(5)-120(7), the identification of UE 130(2) and respective measured signal strengths corresponding to the DMRS. The measured signal strengths may be the strength of the uplink transmission as received by eNBs 120(5)-120 (7) (e.g., RSSI reported by eNBs 120(5)-120(7)). At 232(1)-232(4) and 232(8), SeNB 110 obtains, from eNBs 120(1)-120(4) and 120(8), respective indications that eNBs 120(1)-120(4) and 120(8) have not detected the DMRS. SeNB 110 may obtain these indications periodically from eNBs 120 (1)-120(8) over extensions to the X2 interface.

At 234, SeNB 110 determines that UE 130(2) is within the range(s) of eNBs 120(5)-120(7), and that UE 130(2) is not within the range of eNBs 120(1)-120(4) and 120(8). SeNB 110 may prepare an RF map indicating as much and compute a position of UE 130(2). Based on the RF map, SeNB 110 may further generate a pruned neighbor list including an identification of eNBs 120(5)-120(7), and excluding an identification of eNBs 120(1)-120(4) and 120(8). At 236, SeNB 110 provides the pruned neighbor list to UE 130(2). If UE 130(2) does not hand over to eNBs 120(5)-120(7), SeNB 110 may provide a non-pruned neighbor list (including eNBs 120(1)-120(4) and 120(8)) to UE 130(2) in order to address the possibility that eNBs 120(1)-120(4) and 120(8) detected the DMRS but did not report this detection to SeNB 110.

Figure 3:
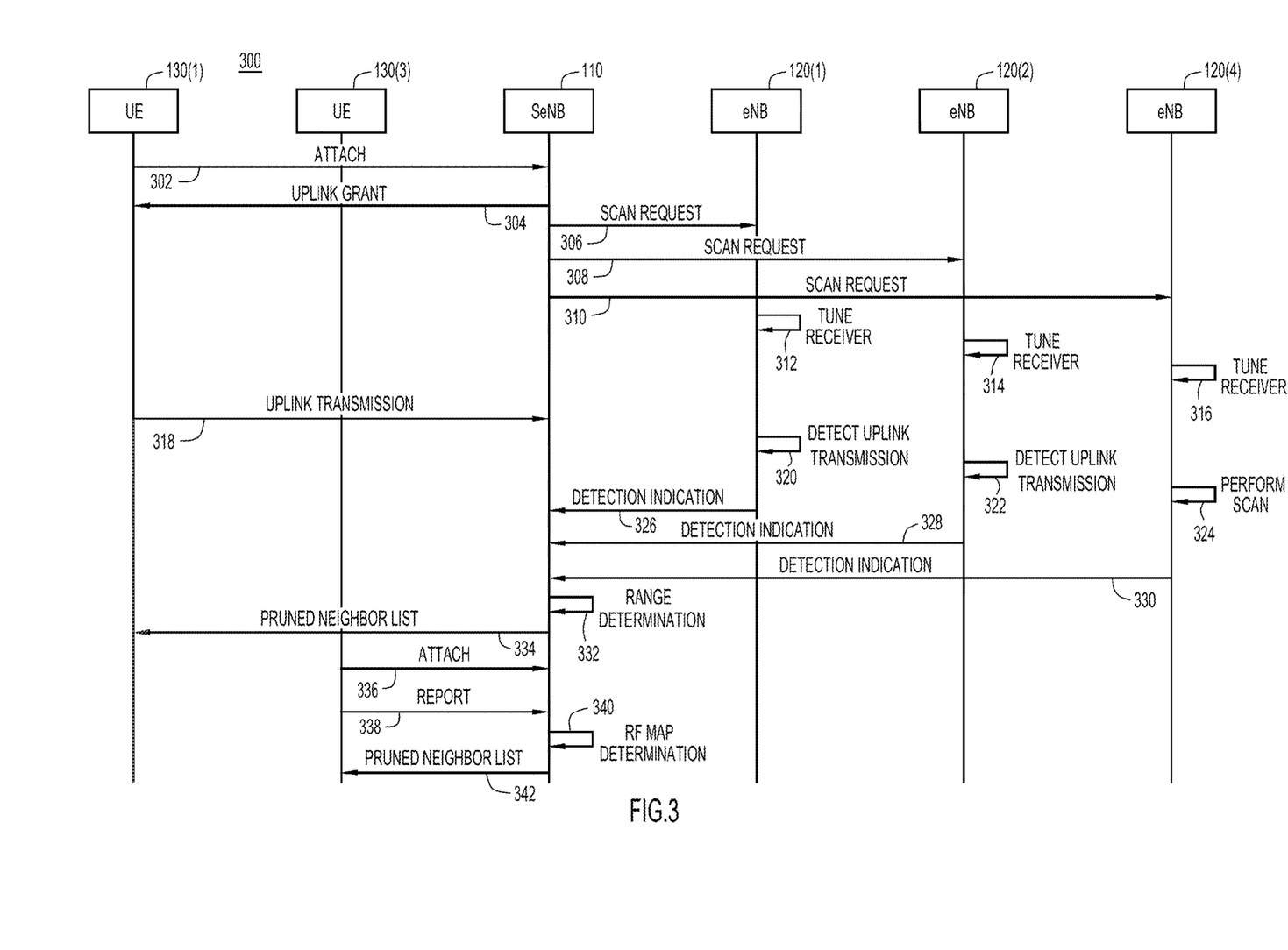
FIG. 3 illustrates another sequence diagram of a method for pruning a neighbor list based on a DMRS, according to an example embodiment.

Turning now to FIG. 3, and with continued reference to FIG. 1, shown is a sequence diagram of a method 300 for pruning a neighbor list based on a DMRS. At 302, UE 130(1) attaches to SeNB 110. At 304, SeNB 110 allocates an uplink grant to UE 130(1) to enable uplink transmission. At 306, SeNB 110 provides, to eNB 120(1), an indication of the DMRS that is transmitted by UE 130(1). SeNB 110 may also provide, to eNB 120(1), an identification of UE 130(1) (e.g., a C-RNTI), a time slot of the DMRS, an identification of a cell that includes SeNB 110 (e.g., a PCI), and/or a frequency used by SeNB 110. In one example, SeNB 110 provides this information in a scan request to eNB 120(1).

At 308, SeNB 110 provides, to eNB 120(2), an indication of the DMRS that is transmitted by UE 130(1). SeNB 110 may also provide, to eNB 120(2), the identification of UE 130(1), the time slot of the DMRS, the identification of the cell, and/or the frequency used by SeNB 110. In one example, SeNB 110 provides this information in a scan request to eNB 120(2). At 310, SeNB 110 provides, to eNB 120(4), an indication of the DMRS that is transmitted by UE 130(1). SeNB 110 may also provide, to eNB 120(4), the identification of UE 130(1), the time slot of the DMRS, the identification of the cell, and/or the frequency used by SeNB 110. In one example, SeNB 110 provides this information in a scan request to eNB 120(4).

eNBs 120(1), 120(2), and 120(4) may create respective schedules to periodically scan neighboring frequencies. At 312, eNB 120(1) tunes one or more receivers to the frequency used by SeNB 110. At 314, eNB 120(2) tunes one or more receivers to the frequency used by SeNB 110. At 316, eNB 120(4) tunes one or more receivers to the frequency used by SeNB 110. In one example, eNBs 120(1), 120(2), and/or 120(4) may utilize one or more scanning radios to minimize cell outage to UEs served by eNBs 120(1), 120(2), and/or 120(4).

At 318, UE 130(1) sends an uplink transmission to SeNB 110, although the uplink transmission may also be detectable by other eNBs. The uplink transmission may include the DMRS. At 320, eNB 120(1) detects the uplink transmission because eNB 120(1) is within a range of UE 130(1) and decodes the DMRS signal. Based on the DMRS signal and the information in the scan request, eNB 120(1) may determine the identification of the cell that includes SeNB 110 as well as the identification of UE 130(1). Similarly, at 322, eNB 120(2) detects the uplink transmission because eNB 120(2) is within a range of UE 130(1) and decodes the DMRS signal. Based on the DMRS signal and the information in the scan request, eNB 120(2) may determine the identification of the cell that includes SeNB 110 as well as the identification of UE 130(1). At 324, eNB 120(4) performs a scan at the frequency used by SeNB 110 but does not detect the uplink transmission because eNB 120(4) is not within a range of UE 130(1).

At 326, SeNB 110 obtains, from eNB 120(1), an indication that eNB 120(1) has detected the DMRS. SeNB 110 may further obtain, from eNB 120(1), the identification of UE 130(1) and a measured signal strength corresponding to the DMRS. The measured signal strength may be the strength of the uplink transmission as received by eNB 120(1) (e.g., RSSI reported by eNB 120(1)). At 328, SeNB 110 obtains, from eNB 120(2), an indication that eNB 120(1) has detected the DMRS. SeNB 110 may further obtain, from eNB 120(2), the identification of UE 130(1) and a measured signal strength corresponding to the DMRS. The measured signal strength may be the strength of the uplink transmission as received by eNB 120(2) (e.g., RSSI reported by eNB 120(2)). At 330, SeNB 110 obtains, from eNB 120(4), an indication that eNB 120(4) has not detected the DMRS. SeNB 110 may obtain these indications periodically from eNBs 120(1), 120(2), and/or 120(4) over extensions to the X2 interface.

At 332, SeNB 110 determines that UE 130(1) is within the range(s) of eNB 120(1) and eNB 120(2), and that UE 130(1) is not within the range of eNB 120(4). SeNB 110 may prepare an RF map indicating as much and compute a position of UE 130(1). Based on the RF map, SeNB 110 may further generate a pruned neighbor list including an identification of eNB 120(1) and eNB 120(2), and excluding an identification of eNB 120(4). At 334, SeNB 110 provides the pruned neighbor list to UE 130(1). If UE 130(1) does not hand over to eNB 120(1) or eNB 120(2), SeNB 110 may provide a non-pruned neighbor list (including eNB 120(4)) to UE 130(1) in order to address the possibility that eNB 120(4) detected the DMRS but did not report this detection to eNB 120(4).

At 336, UE 130(3) attaches to SeNB 110. The RF map of UE 130(3) is similar to that of UE 130(1). UE 130(3) may determine that UE 130(3) is within the range(s) of eNB 120(1) and eNB 120(2) but not eNB 120(4) based on periodic measurements taken by UE 130(3). At 338, SeNB 110 obtains, from UE 130(3), a report that UE 130(3) is within a range(s) of eNB 120(1) and eNB 120(2), but not within a range of eNB 120(4). At 340, based on the report, SeNB 110 determines that the RF map created from UE 130(1) may be applied to UE 130(3). At 342, SeNB 110 provides the pruned neighbor list to UE 130(3).

The techniques described herein may enable use cases in addition to pruning neighbor lists. One example is PCI resolution. While decoding an uplink transmission obtained from UE 130(3), SeNB 110 may determine that UE 130(3) is transmitting the same DMRS as UE 130(1) even though SeNB 110 did not cause UE 130(3) to transmit the DMRS. This may imply that another eNB (e.g., eNB 120(1)) may be transmitting on the same frequency with same PCI as SeNB 110, even though DMRSs should be unique per PCI and UE. Therefore, SeNB 110 may prompt the UE 130(1) or 130(3) to transmit a different reference signal. For example, SeNB 110 may trigger a PCI re-selection algorithm to avoid conflicting DMRSs within the same PCI.

Another use case involves UE position determination (e.g., indoor location determination of UE 130(1)). When SeNB 110 obtains the indications from eNBs 120(1) and 120(2) that eNBs 120(1) and 120(2) detected the DMRS of UE 130(1), SeNB 110 may conclude that UE 130(1) is within the vicinity of eNBs 120(1) and 120(2). Therefore, SeNB 110 may approximate a physical location of UE 130(1) based on the eNBs 120(1) and eNB 120(2) being within the range of UE 130(1). In one example, SeNB 110 may determine a more precise location of UE 130(1) by applying triangulation techniques based on the RSSI reported by eNBs 120(1) and 120(2) as well as the RSSI calculated locally by SeNB 110 for UE 130(1). Alternatively, SeNB 110 may estimate the position of UE 130(1) based on a timing offset between the respective times at which eNBs 120(1) and 120(2) detected the DMRS.

Figure 4:
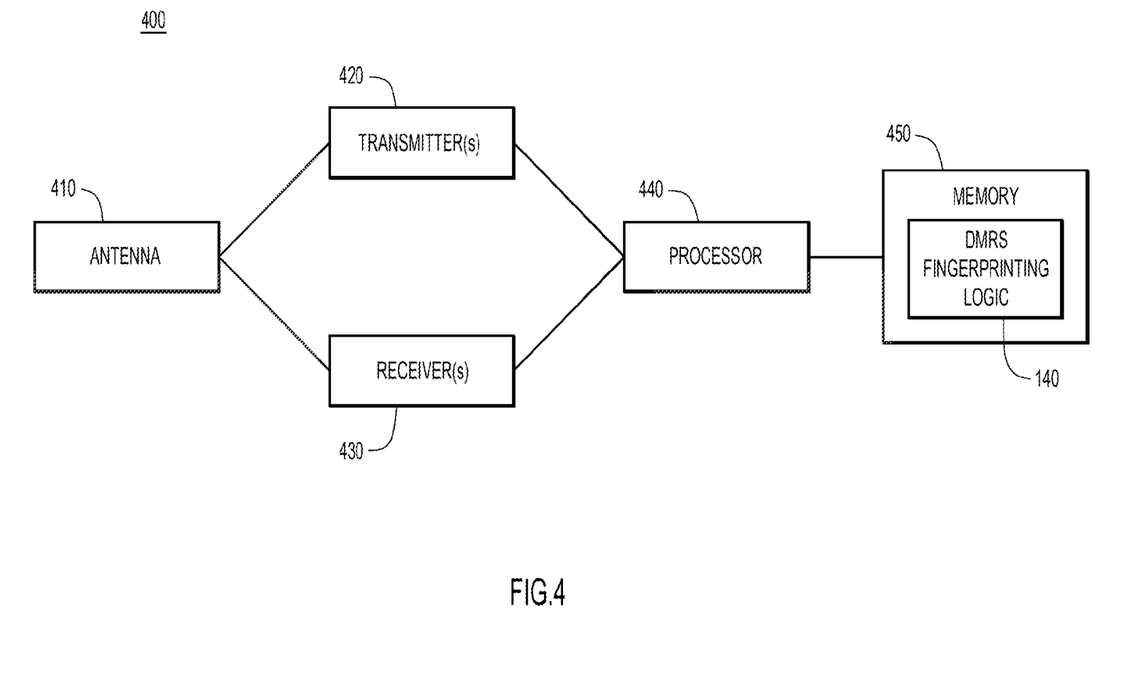
FIG. 4 illustrates a block diagram of a base station entity configured to fingerprint a UE based on a DMRS, according to an example embodiment.

FIG. 4 illustrates a hardware block diagram of device 400 (e.g., a base station entity such as SeNB 110). Device 400 includes antenna 410, one or more transmitters 420, one or more receivers 430, processor 440, and memory 450. Antenna 410, one or more transmitters 420, and one or more receivers 430 may collectively serve as a network interface configured to provide and/or obtain network communications to/from other data processing systems or devices. Instructions for DMRS fingerprinting logic 140 may be stored in memory 450 for execution by processor 440. It should be appreciated that FIG. 4 provides only an illustration of one embodiment and does not imply any limitations with regard to the environments in which different embodiments may be implemented. Many modifications to the depicted environment may be made.

Memory 450 may be any suitable volatile or non-volatile computer readable storage media. Memory 450 may include Random Access Memory (RAM), cache memory, persistent storage, magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information. The media used by memory 450 may be removable (e.g., hard drive, optical or magnetic disk, thumb drive, smart card, etc.).

Figure 5:
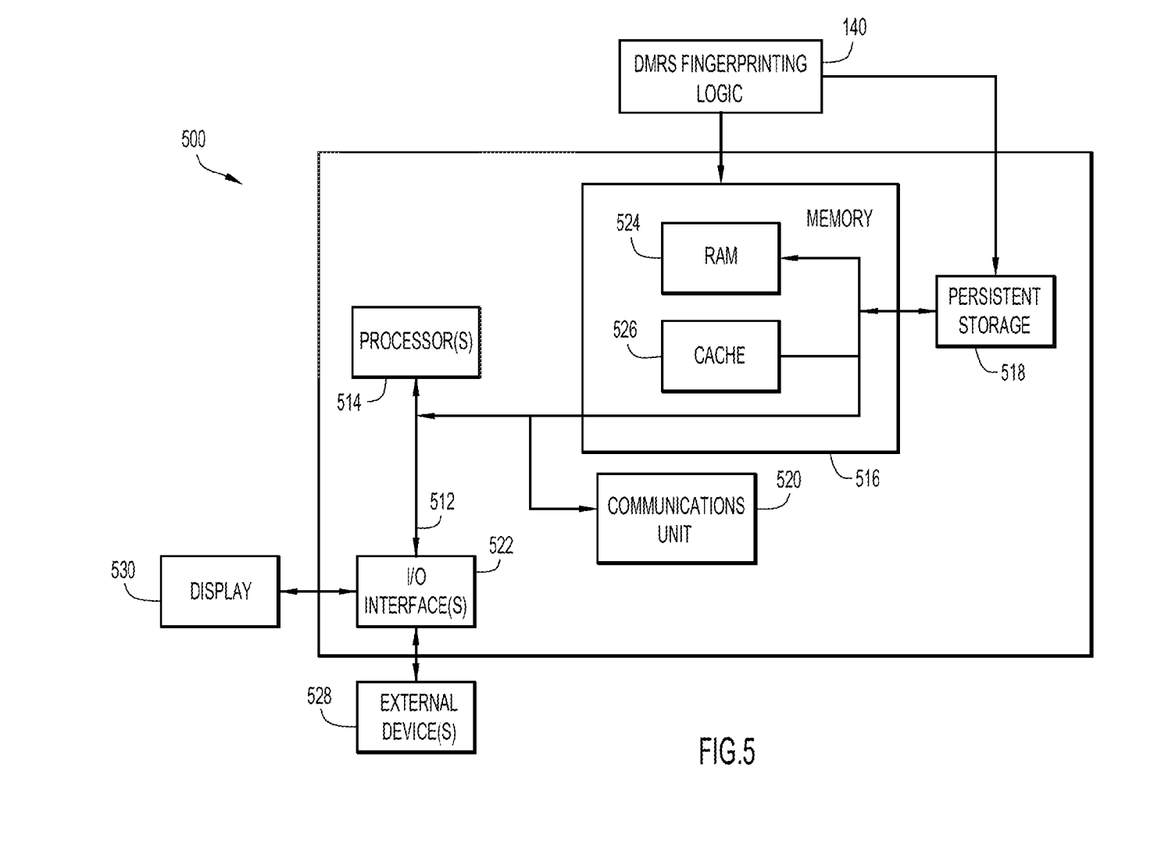
FIG. 5 illustrates a block diagram of a control entity configured to fingerprint a UE based on a DMRS, according to an example embodiment.

FIG. 5 illustrates a block diagram of a device 500 (e.g., control entity 135) configured to fingerprint a UE based on a DMRS. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and Input/Output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes Random Access Memory (RAM) 524 and cache memory 526. In general, memory 516 can include any suitable volatile or non-volatile computer readable storage media. Instructions for DMRS fingerprinting logic 140 may be stored in memory 516 or persistent storage 518 for execution by computer processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to device 500. For example, I/O interface(s) 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

Figure 6:
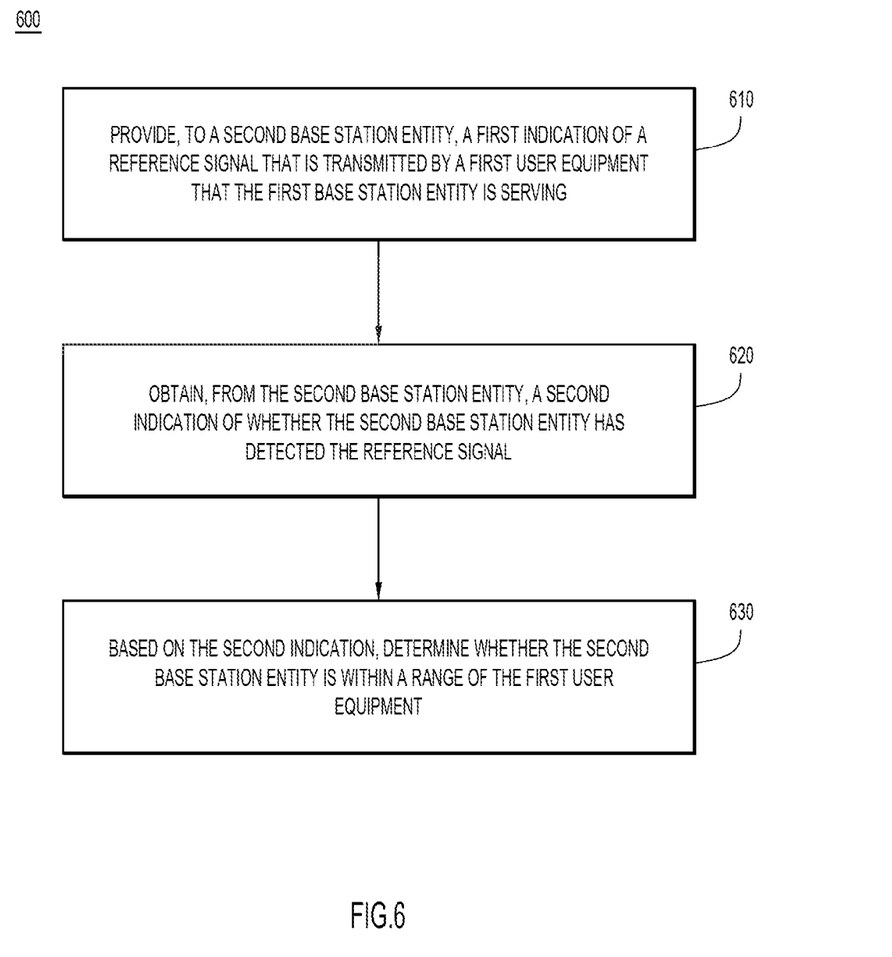
FIG. 6 illustrates a flowchart of a method for fingerprinting a UE based on a DMRS, according to an example embodiment.

FIG. 6 is a flowchart of an example method 600 for fingerprinting a UE based on a DMRS. A first base station entity (e.g., SeNB 110) may perform method 600. At 610, the first base station entity provides, to a second base station entity, a first indication of a reference signal that is transmitted by a first user equipment that the first base station entity is serving. At 620, the first base station entity obtains, from the second base station entity, a second indication of whether the second base station entity has detected the reference signal. At 630, based on the second indication, the first base station entity determines whether the second base station entity is within a range of the first user equipment.

Described herein are techniques for determining a location fingerprint for a UE based on DMRS signals received at multiple eNBs. This may be accomplished by neighboring eNBs decoding DMRSs. This approach has multiple use cases. One example involves reducing/pruning a neighbor list in CBRS. Using the DMRS to create a neighbor list may enable creation of a pruned neighbor list based on an estimated location of the UE vis-a-vis neighboring eNBs. Other use cases include PCI conflict/confusion identification and relative UE location determination.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: at a first base station entity: providing, to a second base station entity, a first indication of a reference signal that is transmitted by a first user equipment that the first base station entity is serving; obtaining, from the second base station entity, a second indication of whether the second base station entity has detected the reference signal; and based on the second indication, determining whether the second base station entity is within a range of the first user equipment.

In one example, the method further comprises: if it is determined that the second base station entity is within the range of the first user equipment: generating a pruned neighbor list that includes an identification of the second base station entity; and providing the pruned neighbor list that includes the identification of the second base station entity to the first user equipment; and if it is determined that the second base station entity is not within the range of the first user equipment: generating a pruned neighbor list that excludes the identification of the second base station entity;

and providing the pruned neighbor list that excludes the identification of the second base station entity to the first user equipment.

In a further example, if it is determined that the second base station entity is within the range of the first user equipment: obtaining, from a second user equipment, a third indication that the second base station entity is within a range of the second user equipment; and based on the third indication, providing the pruned neighbor list that includes the identification of the second base station entity to the second user equipment; and if it is determined that the second base station entity is not within the range of the first user equipment: obtaining, from the second user equipment, a fourth indication that the second base station entity is not within the range of the second user equipment; and based on the fourth indication, providing the pruned neighbor list that excludes the identification of the second base station entity to the second user equipment.

In one example, the method further comprises: if it is determined that the second base station entity is within the range of the first user equipment: approximating a physical location of the first user equipment based on the second base station entity being within the range of the first user equipment. In another example, the method further comprises: identifying a second user equipment that is transmitting the reference signal; and prompting the first user equipment or the second user equipment to transmit a different reference signal.

In one example, the method further comprises: providing, to the second base station entity, an identification of the first user equipment, wherein, if it is determined that the second base station entity is within the range of the first user equipment: obtaining the second indication includes obtaining the identification of the first user equipment. In another example, the method further comprises: if it is determined that the second base station entity is within the range of the first user equipment: obtaining the second indication includes obtaining a measured signal strength corresponding to the reference signal.

In one example, the method further comprises: providing, to the second base station entity, a third indication of a time slot of the reference signal. In another example, the method further comprises: providing, to the second base station entity, an identification of a cell that includes the first base station entity. In yet another example, the method further comprises: providing, to the second base station entity, a third indication of a frequency used by the first base station entity.

In one example, the reference signal is a demodulation reference signal. In another example, the first base station entity is a first citizens broadband radio service device and the second base station entity is a second citizens broadband radio service device.

In another form, an apparatus is provided. The apparatus comprises: a network interface configured to obtain or provide network communications; and one or more processors coupled to the network interface, wherein the one or more processors are configured to: provide, to a base station entity, a first indication of a reference signal that is transmitted by a first user equipment that the apparatus is serving; obtain, from the base station entity, a second indication of whether the base station entity has detected the reference signal; and based on the second indication, determine whether the base station entity is within a range of the first user equipment.

In another form, one or more non-transitory computer readable storage media are provided. The non-transitory computer readable storage media are encoded with instructions that, when executed by a processor of a first base station entity, cause the processor to: provide, to a second base station entity, a first indication of a reference signal that is transmitted by a first user equipment that the first base station entity is serving; obtain, from the second base station entity, a second indication of whether the second base station entity has detected the reference signal; and based on the second indication, determine whether the second base station entity is within a range of the first user equipment.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a first base station entity:
   providing, to a second base station entity, a first indication of a reference signal that is transmitted by a first user equipment that the first base station entity is serving;
   obtaining, from the second base station entity, a second indication of whether the second base station entity has detected, based on the first indication, the reference signal transmitted by the first user equipment; and
   based on the second indication, determining whether the second base station entity is within a range of the first user equipment.

2. The method of claim 1, further comprising:
   conditionally including, based on the determining, an identification of the second base station entity in a pruned neighbor list; and
   providing the pruned neighbor list to the first user equipment.

3. The method of claim 2, further comprising:
   second obtaining, from a second user equipment, an indication of whether the second base station entity is within a range of the second user equipment;
   conditionally including, based on the second obtaining, the second base station entity in a second pruned neighbor list; and
   providing the second pruned neighbor list to the second user equipment.

4. The method of claim 1, further comprising:
   determining that the second base station entity is within the range of the first user equipment; and
   approximating a physical location of the first user equipment based on the determining that the second base station entity is within the range of the first user equipment.

5. The method of claim 1, further comprising:
   identifying a second user equipment that is transmitting the reference signal; and
   prompting the first user equipment or the second user equipment to transmit a different reference signal.

6. The method of claim 1, further comprising:
   providing, to the second base station entity, an identification of the first user equipment;
   determining that the second base station entity is within the range of the first user equipment; and
   obtaining the identification of the first user equipment in response to the determining.

7. The method of claim 1, further comprising:
determining that the second base station entity is within the range of the first user equipment; and
obtaining, in response to the determining, a measured signal strength corresponding to the reference signal.

8. The method of claim 1, wherein the first indication of the reference signal includes an indication of one or more of a time slot of the reference signal, an identification of a cell of the first user equipment, or a transmission frequency of the reference signal.

9. The method of claim 1, wherein the reference signal is a demodulation reference signal (DMRS), and the first indication enables the second base station entity to listen for the DMRS.

10. The method of claim 1, wherein the first base station entity is a first citizens broadband radio service device and the second base station entity is a second citizens broadband radio service device.

11. An apparatus comprising:
a network interface configured to obtain or provide network communications; and
one or more processors coupled to the network interface, wherein the one or more processors are configured to perform operations comprising:
providing, to a base station entity, a first indication of a reference signal that is transmitted by a first user equipment that the apparatus is serving;
obtaining, from the base station entity, a second indication of whether the base station entity has detected, based on the first indication, the reference signal from the first user equipment; and
based on the second indication, determining whether the base station entity is within a range of the first user equipment.

12. The apparatus of claim 11, the operations further comprising:
conditionally including, based on the determining, an identification of the base station entity in a pruned neighbor list; and
providing the pruned neighbor list to the first user equipment.

13. The apparatus of claim 11, the operations further comprising:
determining that the base station entity is within the range of the first user equipment; and
approximating a physical location of the first user equipment based on a determination that the base station entity is within the range of the first user equipment.

14. The apparatus of claim 11, the operations further comprising:
identifying a second user equipment that is transmitting the reference signal; and
prompting the first user equipment or the second user equipment to transmit a different reference signal.

15. One or more non-transitory computer readable storage media encoded with instructions that, when executed by a processor of a first base station entity, cause the processor to perform operations comprising:
providing, to a second base station entity, a first indication of a reference signal that is transmitted by a first user equipment that the first base station entity is serving;
obtaining, from the second base station entity, a second indication of whether the second base station entity has detected, based on the first indication, the reference signal from the first user equipment; and
based on the second indication, determining whether the second base station entity is within a range of the first user equipment.

16. The one or more non-transitory computer readable storage media of claim 15, the operations further comprising:
conditionally including, based on the determining, an identification of the second base station entity in a pruned neighbor list; and
providing the pruned neighbor list to the first user equipment.

17. The one or more non-transitory computer readable storage media of claim 15, the operations further comprising:
determining that the second base station entity is within the range of the first user equipment; and
approximating a physical location of the first user equipment based on the determination that the second base station entity is within the range of the first user equipment.

18. The one or more non-transitory computer readable storage media of claim 15, the operations further comprising:
identifying a second user equipment that is transmitting the reference signal; and
prompting the first user equipment or the second user equipment to transmit a different reference signal.

19. The apparatus of claim 11, wherein the first indication of the reference signal includes an indication of one or more of a time slot of the reference signal, an identification of a cell of the first user equipment, or a transmission frequency of the reference signal.

20. The one or more non-transitory computer readable storage media of claim 15, wherein the first indication of the reference signal includes an indication of one or more of a time slot of the reference signal, an identification of a cell of the first user equipment, or a transmission frequency of the reference signal.

* * * * *